March 11, 1930.   F. G. KOEHLER   1,749,978
TRUCK
Filed Sept. 29, 1928   2 Sheets-Sheet 1
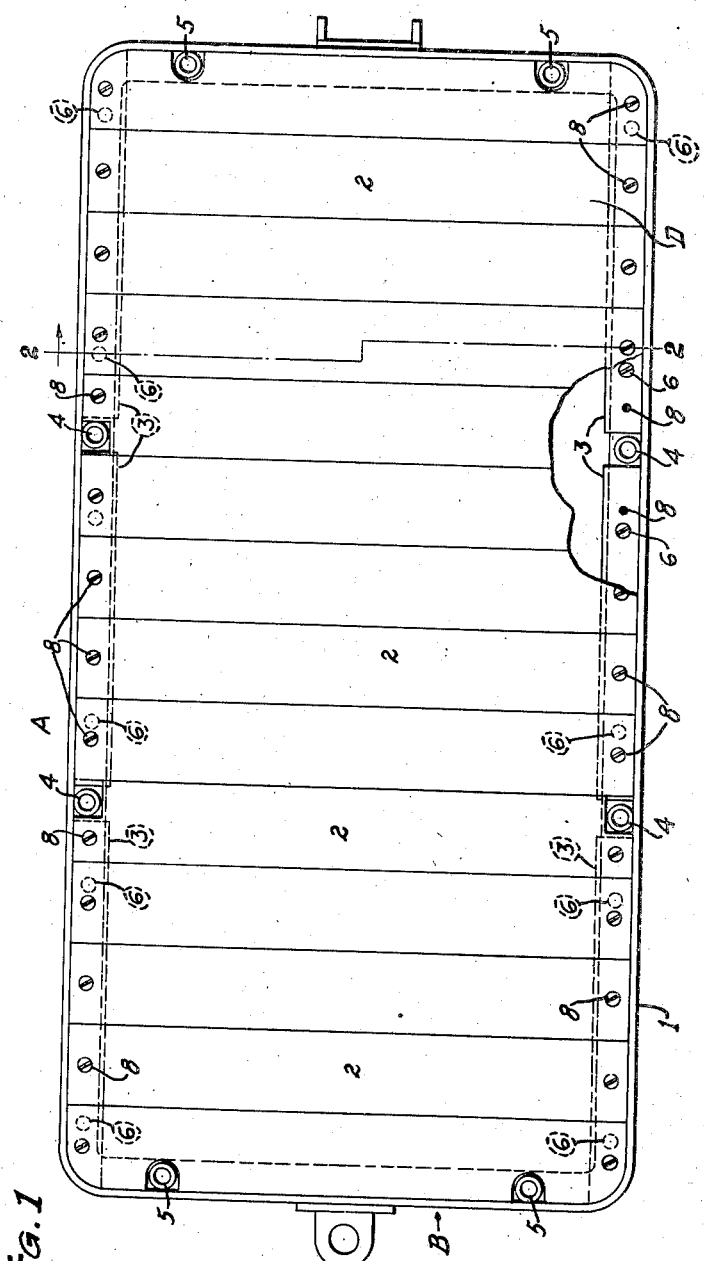
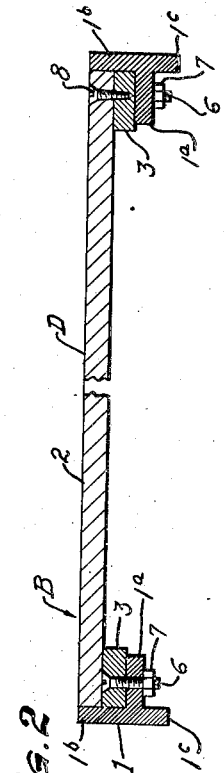
INVENTOR
F. G. KOEHLER
BY J. G. Cook
ATTORNEY March 11, 1930.  F. G. KOEHLER  1,749,978
TRUCK
Filed Sept. 29, 1928  2 Sheets-Sheet 2
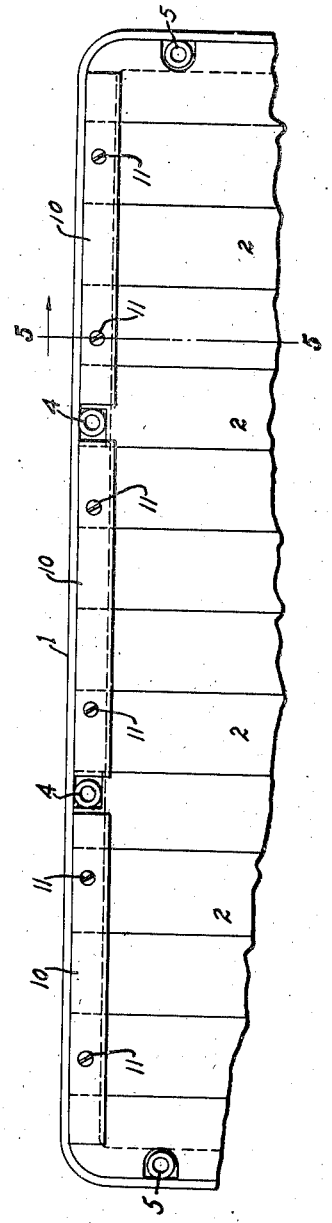
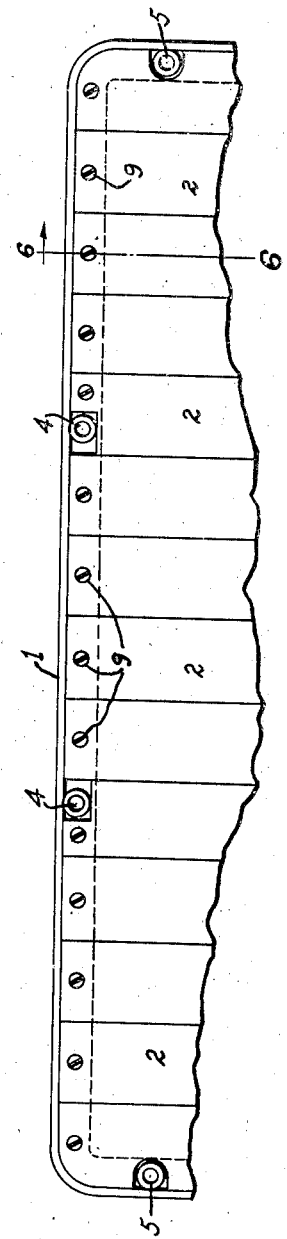
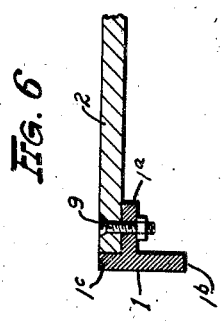
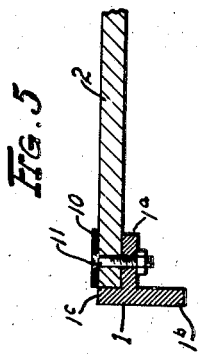
INVENTOR
F. G. KOEHLER
BY
ATTORNEY Patented Mar. 11, 1930

1,749,978

UNITED STATES PATENT OFFICE

FRANK G. KOEHLER, OF ST. LOUIS, MISSOURI

TRUCK

Application filed September 29, 1928. Serial No. 309,253.

This invention relates generally to trucks of the type employed in railroad stations, factories, warehouses, and a great variety of other places for transporting articles from place to place therein, and particularly to an improved construction for the deck portion of a truck of the type referred to, the predominant object of the invention being to so construct the deck portion of a truck that the boards or other elements comprising the deck thereof may be assembled with the deck frame in various arrangements to produce decks having different characteristics.

Fig. 1 is a plan view of a truck constructed and arranged in accordance with my invention.

Fig. 2 is an enlarged section on line 2—2 of Fig. 1, a portion of the deck of the truck being broken away in Fig. 2 to conserve space.

Fig. 3 is a fragmentary plan view of my improved truck showing the parts of which the deck portion is composed arranged in a manner different from that shown in Figs. 1 and 2.

Fig. 4 is a fragmentary plan view showing still another arrangement of the parts composing the deck portion of the truck.

Fig. 5 is an enlarged section on line 5—5 of Fig. 3.

Fig. 6 is an enlarged section on line 6—6 of Fig. 4.

In the drawing, wherein is illustrated one embodiment merely of the invention A designates a truck constructed in accordance with the present invention, said truck comprising a deck portion B and the usual ground wheels, which, because they do not form parts of the present invention are not shown in the drawings.

The deck portion B of my improved truck comprises an approximately rectangular deck frame 1 which entirely surrounds the deck D of the truck at the marginal edge thereof said deck D being composed of a plurality of deck boards or other elements 2 which are supported by the deck frame 1 in a manner to be hereinafter set forth. The cross-sectional shape of the deck frame 1 of my improved truck is of paramount importance and constitutes the predominant feature of the present invention and by referring to Fig. 2 of the drawings it will be noted that said deck frame is approximately T-shaped in cross-section, said cross-sectional construction of said deck frame including a horizontally disposed leg $1^a$ an upwardly extended vertical leg $1^b$ and a downwardly extended vertical leg $1^c$. By referring to Fig. 2 it will be noted that legs of the deck frame 1 are not of equal length as is usually the case in T-bar construction but as clearly shown in the view referred to the downwardly extended vertical leg $1^c$ is of substantially less length than the leg $1^b$. Because of the reduced length of the leg $1^c$ a recess for the end portions of the deck boards of the deck of the truck is provided at the top or bottom of the deck frame at which said leg $1^c$ is disposed which is of less depth than a similar recess at the opposite top or bottom side of said deck frame.

In the arrangement of the parts of the deck portion of my improved truck as shown in Figs. 1 and 2, the deck frame is arranged with the short leg $1^c$ at the lower portion of said frame. Also in accordance with this arrangement I employ a plurality of fillers 3 which are arranged longitudinally of the deck frame 1 at each side thereof and in contact with the top face of the horizontal leg $1^a$. The deck frame is provided with a pair of spaced apart stake pockets 4 at each side of the deck and a pair of spaced apart stake pockets 5 at each end of said deck and to avoid interference between the fillers 3 and the stake pockets 4, which latter are preferably supported by the horizontal leg $1^a$, I employ a plurality of the fillers at each side of the deck and space said fillers apart from each other at certain of their ends so as to provide spaces in which the stake pockets 4 are located. It is obvious however, that if desired I may employ a single filler extended from end to end of the truck, which filler would be provided with apertures through which the stake pockets 4 would extend.

The fillers 3 of the construction illustrated in Figs. 1 and 2 are secured in place to the horizontal leg $1^a$ of the deck frame 1 by means of bolts 6, said bolts being extended through apertures in said fillers and in said horizontal leg as shown in Fig. 2. The bolts 6 are provided with head portions which are countersunk in use so as to avoid interference with the deck elements 2 and the lower screw-threaded ends of said bolts receive nuts 7 which are screwed against the lower face of the horizontal leg 1ª.

The deck boards or elements 2 are secured to the fillers 3 as shown at the right hand end of Fig. 2, each of said boards or elements having screws or other suitable fastening devices 8 extended through said board or element at the opposite ends thereof and into the associated fillers to securely fix said deck boards or elements 2 to said fillers and the head portions of said fastening devices being countersunk. It will be noted that when the deck parts are assembled as shown in Figs. 1 and 2 the top surfaces of the deck boards or elements 2 are approximately flush with the top edge of the deck frame 1.

When it is desired to construct a truck having a deck portion which does not include as parts thereof the fillers 3 already referred to herein the deck frame 1 of the deck structure is reversed top for bottom. The deck frame will then be positioned as shown in Figs. 5 and 6 in which views it is clearly shown that the short vertical leg 1ᶜ of the deck frame is at the upper end thereof whereby the horizontal leg 1ª will be located much closer to the upper edge of the deck frame than when the deck frame is positioned as shown in Fig. 2. In accordance with the construction of the deck portion of the truck when the deck frame 1 is positioned as illustrated in Figs. 5 and 6 the deck boards or elements 2 rest directly upon the horizontal leg 1ª of said deck frame and said deck boards or elements 2 may be secured in place by bolts or other suitable fastening devices 9 located at the opposite ends of each of said boards or elements which fastening devices pass through said boards and through apertures in the horizontal leg 1ª of the deck frame as shown in Fig. 6. If desired, however, I may employ one or more thin metal strips 10 at each side of the deck through which bolts or other fastening devices 11 pass, which fastening devices pass also through apertures formed through some of the deck boards or elements 2 and through apertures formed through the horizontal leg 1ª of the deck frame 1. When either of the arrangements shown in Figs. 5 or 6 are employed the fastening devices 9 and 11 are, of course, provided with nuts on their threaded ends and said fastening devices are provided with head portions which are countersunk. Also when the strips 10 are used and it is desired to do so said strips may be countersunk so that the top surfaces thereof will be flush with the top surfaces of the deck boards or elements 2.

It is obvious, of course, that when the deck frame 1 is reversed in accordance with the arrangements shown in Figs. 5 and 6 the positions of the stake pockets 4 and 5 must be such that they extend upwardly.

I claim:

1. A truck having a deck portion including a deck frame arranged about the marginal edge of said deck portion, said deck frame being substantially T-shaped in cross-section and having a horizontally disposed leg portion arranged to provide the deck frame with marginal recesses arranged one above the other, one of which is deeper than the other, said deck frame being reversible top for bottom to present one or the other of said recesses at the top of the deck frame, deck boards having their end portions disposed in the recess located at the top of the deck frame and supported by the horizontal leg of the deck frame structure to present the top surfaces of said deck boards substantially flush with the top edge of the deck frame, said deck boards having fillers interposed between the same and said horizontal leg when the end portions of said deck boards are disposed in the deeper of said recesses upon reversal of the deck frame.

2. A truck having a deck portion including a deck frame arranged about the marginal edge of said deck portion, said deck frame being substantially T-shaped in cross-section and having a horizontally disposed leg which is offset vertically upwardly from the vertical center of the cross-sectional structure of said deck frame to provide the deck frame with marginal recesses arranged one above the other, the lower one of which is deeper than the other, said deck frame being reversible top for bottom to present one or the other of said recesses at the top of the deck frame, deck boards having their end portions disposed in the recess located at the top of the deck frame and supported by the horizontal leg of the deck frame structure to present the top surfaces of said deck boards substantially flush with the top edge of the deck frame, said deck boards having fillers interposed between the same and said horizontal leg when the end portions of said deck boards are disposed in the deeper of said recesses upon reversal of the deck frame.

In testimony that I claim the foregoing I hereunto affix my signature.

FRANK G. KOEHLER.